`US006696036B2`

(12) United States Patent
Victor et al.

(10) Patent No.: US 6,696,036 B2
(45) Date of Patent: Feb. 24, 2004

(54) METHOD OF MAKING SILICA FROM RICE BRAN

(75) Inventors: Vinogradov Victor, Khabarovsk (RU); Dmitri Victor, Khabarovsk (RU); Bylkov Alexandre, Khabarovsk (RU)

(73) Assignees: RK Chemical Co., Ltd., Seoul (KR); Jae-Youb You, Seoul (KR)

( * ) Notice: Subject to any disclaimer, the term of this patent is extended or adjusted under 35 U.S.C. 154(b) by 241 days.

(21) Appl. No.: 09/958,177
(22) PCT Filed: Feb. 8, 2001
(86) PCT No.: PCT/KR01/00191
§ 371 (c)(1), (2), (4) Date: Nov. 13, 2001
(87) PCT Pub. No.: WO01/58808
PCT Pub. Date: Aug. 16, 2001

(65) Prior Publication Data
US 2003/0012720 A1 Jan. 16, 2003

(30) Foreign Application Priority Data

Feb. 9, 2000 (KR) ........................................... 2000/5946
Jan. 31, 2001 (KR) ........................................... 2001/4668

(51) Int. Cl.$^7$ ............................................. C01B 33/12
(52) U.S. Cl. ...................................... 423/337; 423/335
(58) Field of Search ................................. 423/335, 337

(56) References Cited

U.S. PATENT DOCUMENTS 4,619,911 A * 10/1986 Goodwin et al. ........... 502/411

FOREIGN PATENT DOCUMENTS

KR    A 95-18466    7/1995

* cited by examiner

Primary Examiner—Stanley S. Silverman
Assistant Examiner—Edward M. Johnson
(74) Attorney, Agent, or Firm—Birch, Stewart, Kolasch & Birch, LLP

(57) ABSTRACT

A method for extracting silica of more than 99.99% purity from rice bran includes the steps of: washing rice bran in water and removing impurities floated on the water; sequentially washing the rice bran in an acid solution and water more than twice; dehydrating the washed rice bran under pressure; drying the dehydrated rice bran; burning the dried rice bran at a temperature of 350~400° C. while being agitated and pulverized; and burning the rice bran at a temperature of 700~1000° C. for 10~60 minutes while being agitated by providing oxygen or air. The soot, a by-product detrimental to the environment, generated during burning the rice bran in the process of extracting silica, can be effectively removed.

12 Claims, No Drawings

METHOD OF MAKING SILICA FROM RICE BRAN

This application is the national phase under 35 U.S.C. §371 of PCT International Application No. PCT/KR01/00191 which has an International filing date of Feb. 8, 2001, which designated the United States of America.

TECHNICAL FIELD

The present invention relates to the extraction of silica from rice bran, and more particularly, to a method for extracting high purity amorphous silica or solid silica from rice bran which is harmless to the environment, of which a by-product from rice bran can be utilized.

BACKGROUND ART

An invention directed to a method for extracting amorphous silica has been filed in China (Chinese Patent Application No. 86-104705), and granted to a patent in India under registration No 159017, and also issued as a Russian patent No. 2061656.

The purity of the silica produced by using the above method is about 82~99.9%, which purity is, however, not suitable for silica in demand in the semiconductor field.

As for the silica produced by the above methods, since the content of coke that remains after burning the rice bran is high, it makes it impossible to obtain a high purity silica.

In addition, when rice bran is burned, soot is discharged, and about 32% CO and $CO_2$ are contained in the smoke from burning rice bran, which is harmful to the environment.

Meanwhile, Korean patent publication No. 97-5090 discloses a method for extracting silica without deforming the structure of silica formed during a growth period of rice by processing rice bran or rice straw with an enzyme and a method for adjusting the silica-carbon ratio by controlling the amount of enzyme and a reaction time.

However, the disclosed methods are directed to the matter of the silica structure, and a residual carbon amount is more than 14 wt %, very high, without description of any method for extracting a high purity silica as required in the present invention.

Moreover, Korean patent publication No. 97-5090 reveals that a Chinese Patent (CN 1,039,568) and a Russian Patent (SU 1,699,918) disclose a method for burning rice bran after processing in acid at a temperature of 700~900° C. to destroy the cellulose crystallization, but without mentioning any method for fabricating a high purity silica from rice bran which are washed with an acid solution, dehydrated under pressure and then burned in a second step, as in the present invention.

Furthermore, Russian Laid-Open Publication No. 94031518 A1 of Jul. 10, 1996, German Laid-Open Publication No. 1532398A of Nov. 15, 1978, a French Laid Open Publication No. 2356595 A1 of Mar. 3, 1978 also disclose a method in which rice bran is sieved to remove impurities, washed with water, washed in an acid solution, dried, burned and pulverized. The silica product obtained by this method has a purity of 99.0~99.5%, but by-products of phytine, phytic acid ($C_6H_6[OPO(OH)_6]$) and xylitol ($CH_2OH(CHOH)_3CH_2OH$) are generated from the soot.

Accordingly, a method for producing high purity silica, which is capable of easily obtaining silica of 99.99% purity, increasing the purity of a silica product by discharging soot generated as a by-product during a burning process of rice bran by using a fan, separating phytic acid and xylitol included in supernatant of a storage tank in which soot has been filtered to be removed, solving an environmental pollution problem due to the by-products by utilizing the soot settled at the bottom of the storage tank as an antiseptic solution, and obtaining a useful product, is highly demanded.

Therefore, an object of the present invention is to provide a method for extracting silica of 99.99% purity from rice bran, which is capable of removing soot, a by-product harmful to the environment, to increase the purity of the silicon product and producing a useful product from the soot.

DISCLOSURE OF INVENTION

In order to achieve the above objects, there is provided a method for extracting silica of more than 99.99% purity from rice bran including: the steps of: (a) pretreating rice bran by washing rice bran and removing impurities floated on the water; (b) sequentially washing the rice bran in an acid solution and water at least twice; (c) dehydrating the washed rice bran under pressure; (d) drying the dehydrated rice bran; (e) priomarily burning the dried rice bran at a temperature of 350~400° C. while agitating and pulverizing; and (f) secondarily burning the rice bran at a temperature of 700~1000° C. for 10~60 minutes while agitating by providing oxygen or air.

BEST MODES FOR CARRYING OUT THE INVENTION

The present invention provides a method for extracting silica of 99.99% purity which is capable of effectively removing soot, a by-product, and obtaining a useful chemical product from such by-product.

In detail, the method for extracting silica of 99.99% purity includes a pre-treatment step (a) in which rice bran is sieved to remove impurities and washed in water to remove impurities floated on the water; a washing step (b) in which the rice bran is sequentially washed in an acid solution diluted with distilled water and then in distilled water at least twice; a step (c) in which the washed rice bran is dehydrated under pressure; a step (d) in which the dehydrated rice bran is dried; a first burning step (e) in which the dried rice bran is burned at a temperature of 350~400° C. while being agitated and pulverized; a second burning step (f) in which the rice bran is burned at a temperature of 700~1000° C. for 10~60 minutes while being agitated by providing oxygen or air.

The processes for extracting high purity silica from rice bran will now be described in more detail.

(a) Pre-Treatment Step:

A quantity of rice bran is sieved to filter out waste matter and then washed in water. At this time, impurities floated on the water are removed. During the washing process, most impurities are removed. These impurities being removed at this time are hardly removed even at a second burning step wherein the rice bran is treated at the high temperature of 700~1000° C., remaining in silica. Thus, removal of the impurities in the washing process is very critical. During the washing process, if the impurities floated on the water are not removed and then the moisture is removed when extracting silica, the finally obtained silica would have a low purity.

During the washing process, the rice bran may be washed in cold water. But when washed in hot water at 85~95° C., the impurities are more effectively removed. In the case of using hot water at 85~95° C., the rice bran is washed by being continuously agitated. Use of hot water disadvantageously incurs a higher production cost. Thus, the combined use of cold water and hot water may be possible in consideration of economical efficiency and desired purity. The water used may be ordinary water, but distilled water is preferred in view of the purity of the obtained silica and the follow-up processes.

In one embodiment of the present invention, if the rice bran is washed in boiling water, that is, boiling water at a temperature of 100° C., for 30 minutes to 120 minutes, since the bubbles generated when water is boiled agitate the rice bran, the rice bran can be advantageously washed without using an additional agitator. Accordingly, as the time period is reduced from 120 minutes to 30 minutes, the purity of the silica is heightened. In addition, in case of washing the rice bran in boiling water, the water obtained after the rice bran is washed includes much phytic acid and xylitol component while the washed rice bran have less organic substances. And soot is reduced, and in case of discharging gas, less poisonous gas ($CO$, $NO_2$) is contained therein.

Before washing the rice bran in an acid solution, a process in which the structure of the rice bran is changed to facilitate removal of organic substances may be arbitrarily added. That is, if the washed rice bran is left at a temperature of $-10$~$-140°$ C. for 10~300 minutes, the final purity of the silica is heightened.

As the liquid contained in the rice bran is frozen, the structure of the rice bran is broken, changing to a form which is easily broken. Thus, after the freezing process, when the rice bran is washed in an acid solution, the organic substances contained in the rice bran can be more easily and quickly removed.

In order to freeze the rice bran, a freezing method known to the persons skilled in the art may be used.

Before washing the rice bran in an acid solution, when the rice bran is left at a low pressure, that is, for example, in a closed chamber in the range of 0.5~200 Pa, and preferably, in the range of 0.5~100 Pa, liquid contained in the rice bran is evaporated, causing an excessive pressure in the rice bran.

Thanks to the excessive pressure, the structure of the rice bran is broken, so that the organic substances in the rice bran can be more easily and quickly removed when washed in the acid solution.

If the pressure in the closed chamber is less than 0.5 Pa, the purity of the finally obtained product is not further heightened, while, if the pressure exceeds 200 Pa, vacuum effect does not affect the purity of the product any more.

(b) Process for Washing Rice Bran in Acid Solution:

The rice bran is washed in an acid solution to sterilize the rice bran and dissolve out the impurities. For example, as the acid solution, solution of sulfuric acid, nitric acid or acetic acid may be used, and it has no relation to the kinds of acids to be used.

The higher the acid concentration of the acid solution, the higher the purity of the finally obtained silica.

The rice bran is washed by being agitated in an acid solution of distilled water to remove impurities, and then washed again in the distilled water. In order to obtain a finally higher purity of silica, preferably, the washing is repeatedly performed as much as possible, and more preferably, the washing is performed more than twice.

In order to obtain a high purity silica, distilled water is preferably used, and the temperatures of the acid solution and of the water to be used are preferably 85~95° C., that is, hot water.

In a different embodiment of the present invention, in case of using an acid solution at a temperature of 85~95° C., since the rice bran is washed while being agitated, a device is additionally required, since the temperature of the acid solution is too low to wash at a high speed.

However, in case of washing the rice bran in a boiling acid solution at a temperature of 100° C., since the rice bran and the solution are continuously moving while the solution is boiling, organic substances contained in the rice bran can be quickly and effectively removed even without agitation.

(c) Dehydrating Process Under Pressure:

A feature of the present invention is that the rice bran is pressurized by a press so to be dehydrated during a dehydrating process, unlike in the conventional silica preparation method.

Since moisture is removed under a constant pressure, the follow-up process, that is, the drying process, can be performed within a short time period and residual impurities which have not been removed in the washing process can be removed.

In case of dehydrating the rice bran under pressure below 0.005 Mpa, impurities contained in the rice bran is increased, and it is impossible to obtain silica of a purity of more than 99.99%.

Accordingly, the pressure to be applied in the dehydrating is suitably 0.01~15 Mpa, and more preferably, 0.1~10 Mpa. Arbitrarily, a washing process may be additionally performed after the dehydrating process under pressure.

In addition, as for the washing process (a), after washing the rice bran, a dehydrating process may be performed to remove impurities.

(d) Drying Process:

A typical drying process can be performed. For example, a hot air drying at about 110° C. may be performed, or drying may be performed by using a microwave oven.

The washed and dehydrated rice bran is dried in the microwave oven preferably for 15~400 seconds, and more preferably, for 30~300 seconds.

If the drying time period in the microwave oven is less than 15 seconds, the purity of the finally obtained product is low due to a carbon impurity, while if the drying time period in the microwave oven exceeds 400 seconds, the purity of the finally obtained product is also low.

(e) First Burning Process:

The rice bran which have undergone the above processes are agitated and pulverized at a temperature of 300~500° C., and at the same time, burned until the smoke dies off. After undergoing the burning process, the volume of the rice bran is reduced by 1.6~1.8 times.

During the first burning process, the rice bran becomes fragile, so that they are easily pulverized. If the rice bran is not agitated in this process, the purity of silica becomes low and the content of $NO_2$ is finally increased.

Concurrently performing of the burning and pulverizing is done to increase the burning speed by making the particles of the rice bran small and to completely remove impurities possibly remaining in the rice bran.

In this process, the smoke generated in a heating chamber is extracted by using a pump or a fan to separate soot. Without the additional process in which the smoke generated in the heating chamber is removed by using the pump and so on to separate soot, more of harmful components, for example, $CO$ and $NO_2$, would be contained in the smoke, which is not good for the environment. The separated soot can be utilized to a different use, and in this sense that a by-product detrimental to the environment is utilized, the present invention is very useful.

In addition, the reason why the smoke is removed is to collect the soot, and soot which has not been filtered finally sinks down to the bottom of a water tank filled with water.

The amount of soot sunk down to the bottom of the water tank is about 2.8~3.2%.

Useful components such as phytine, phytic acid ($C_6H_6[OPO(OH)_6]$) and xylitol ($CH_2OH(CHOH)_3CH_2OH$) can be separated from the supernatant of the water tank, which can be used as a sterilizing water for seeds for seeding. Table 3 below shows an analysis on the components contained in the soot.

(f) Secondary Burning Process:

The rice bran which have undergone the above processes are burned in a heating device at 700~1000° C. while supplying air or oxygen.

Smoke generated during the secondary burning process is removed by using a fan or a pump, and a soot processing method is performed in the same manner as in the first burning process.

The two-step burning of the rice bran is performed for the following reason. If burning is performed together with agitating and pulverizing in the secondary burning process, since the inner wall of a preferred heating device is made of quartz, the quartz inner wall may be broken due to the an agitator and crusher. Also, after undergoing the first burning process, the volume of the rice bran is reduced by 1.6 times to 1.8 times, so that the necessary fabrication sectional area of the heating device for the secondary burning made of high-priced quartz is reduced to be economical. In addition, as the rice bran undergo the first burning process, their impurities are considerably removed, and thus, the rice bran having a high silica purity undergo the secondary oxide-burning in a separate process, so that a high purity silica can be obtained.

In the present invention, solid state silica or amorphous silica is obtained according to the temperature of the secondary burning. That is, solid silica is obtained at a temperature of not less than 950° C., and amorphous silica is obtained at a temperature lower than 950° C.

The burning temperature is preferably 700~1000° C., and in case of amorphous silica typically used for semiconductors, the burning temperature is more preferably 700~800° C.

The burning time period in the secondary burning process is preferably 10~60 minutes, and more preferably, 10~40 minutes.

Specific reaction conditions and obtained result values of exemplary embodiments of the present invention are shown in Table 1 and Table 3.

TABLE 1

Exemplary reaction conditions of the silica preparation method

| Example No. | Dehydration pressure | Removal of floated material in washing | First burning 350~400° C. | Secondary burning Temperature (° C.) | Secondary burning Time period (minutes) |
|---|---|---|---|---|---|
| 1 | 0.1 | ○ | — | 700~800 | 30 |
| 2 | 0.01 | ○ | — | 700~800 | 30 |
| 3 | 0.005 | ○ | — | 700~800 | 30 |
| 4 | 10 | ○ | — | 700~800 | 30 |
| 5 | 15 | ○ | — | 700~800 | 30 |
| 6 | 10 | X | — | 700~800 | 30 |
| 7 | 10 | ○ | — | 700~1000 | 10 |
| 8 | 10 | ○ | — | 700~800 | 40 |
| 9 | 10 | ○ | — | 700~800 | 5 |
| 10 | 10 | ○ | — | 700~800 | 60 |
| 11 | 10 | ○ | Mixture X | 700~1000 | 10 |
| 12 | 10 | ○ | Without a process of removing soot | 700~800 | 30 |

TABLE 2

Exemplary reaction condition of silica preparation method

| Ex. No. | Washing Temperature (° C.) | Washing Time (minutes) | Acid-Washing Temperature (° C.) | Acid-Washing Time (minutes) | Freezing Temperature (° C.) | Freezing Time (minutes) | Vacuum-acid-washing pressure (Pa) | Drying time in microwave oven (seconds) |
|---|---|---|---|---|---|---|---|---|
| 13 | 100 | 15 | 85–95 | 120 | — | — | — | — |
| 14 | 100 | 30 | 85–95 | 120 | — | — | — | — |
| 15 | 100 | 60 | 85–95 | 120 | — | — | — | — |
| 16 | 100 | 90 | 85–95 | 120 | — | — | — | — |
| 17 | 85–90 | 30–120 | 100 | 10 | — | — | — | — |
| 18 | 85–90 | 30–120 | 100 | 20 | — | — | — | — |
| 19 | 85–90 | 30–120 | 100 | 60 | — | — | — | — |
| 20 | 85–90 | 30–120 | 100 | 120 | — | — | — | — |
| 21 | 85–90 | 30–120 | 100 | 240 | — | — | — | — |
| 22 | 85–90 | 30–120 | 85–95 | 120 | −10 | 300 | — | — |

TABLE 2-continued

Exemplary reaction condition of silica preparation method

| | Washing | | Acid-Washing | | Freezing | | Vacuum-acid-washing | Drying time in microwave |
|---|---|---|---|---|---|---|---|---|
| Ex. No. | Temperature (° C.) | Time (minutes) | Temperature (° C.) | Time (minutes) | Temperature (° C.) | Time (minutes) | pressure (Pa) | oven (seconds) |
| 23 | 85–90 | 30–120 | 85–95 | 120 | −70 | 40 | — | — |
| 24 | 85–90 | 30–120 | 85–95 | 120 | −140 | 10 | — | — |
| 25 | 85–90 | 30–120 | 85–95 | 120 | −5 | 400 | — | — |
| 26 | 85–90 | 30–120 | 85–95 | 120 | −170 | 10 | — | — |
| 27 | 85–90 | 30–120 | 85–95 | 120 | — | — | 100 | — |
| 28 | 85–90 | 30–120 | 85–95 | 120 | — | — | 10 | — |
| 29 | 85–90 | 30–120 | 85–95 | 120 | — | — | 1 | — |
| 30 | 85–90 | 30–120 | 85–95 | 120 | — | — | 200 | — |
| 31 | 85–90 | 30–120 | 85–95 | 120 | — | — | 0.5 | — |
| 32 | 85–90 | 30–120 | 85–95 | 120 | — | — | — | 13 |
| 33 | 85–90 | 30–120 | 85–95 | 120 | — | — | — | 100 |
| 34 | 85–90 | 30–120 | 85–95 | 120 | — | — | — | 300 |
| 35 | 85–90 | 30–120 | 85–95 | 120 | — | — | — | 15 |
| 36 | 85–90 | 30–120 | 85–95 | 120 | — | — | — | 400 |

TABLE 3 component analysis result obtained in the silica extracting process of the present invention

| | | Example | | | | | | |
|---|---|---|---|---|---|---|---|---|
| | | 1 | 2 | 3 | 4 | 5 | 6 | 7 |
| Amount of organic substance contained in washed rice bran | | 0.025 | 0.5 | 0.2 | 0.005 | 0.005 | 0.6 | 0.005 |
| Amount of soot contained in smoke (rice bran 400 g) | | 1.2 | 2.5 | 10.0 | 0.25 | 0.25 | 30.0 | 0.25 |
| Final amount of soot | | — | — | — | — | — | — | — |
| Gas component created in burning (Mr/M3) | CO | 0.015 | 0.015 | 0.015 | 0.005 | 0.005 | 0.020 | 0.005 |
| | $CO_2$ | 0.01 | 0.010 | 0.010 | 0.005 | 0.005 | 0.020 | 0.005 |
| | $NO_2$ | 0.005 | 0.005 | 0.005 | 0.001 | 0.001 | 0.01 | 0.001 |
| $SiO_2$ component (%) | S | 0.0004 | 0.0004 | 0.0004 | 0.0004 | 0.0004 | 0.001 | 0.0004 |
| | MgO | 0.001 | 0.001 | 0.001 | 0.0015 | 0.0005 | 0.015 | 0.001 |
| | CaO | 0.003 | 0.003 | 0.006 | 0.001 | 0.001 | 0.008 | 0.003 |
| | $Fe_2O_3$ | 0.002 | 0.002 | 0.003 | 0.0005 | 0.0005 | 0.004 | 0.002 |
| | C | 0.001 | 0.003 | 0.01 | 0.0005 | 0.0005 | 0.10 | 0.0035 |
| | $SiO_2$ | 99.993 | 99.991 | 99.980 | 99.997 | 99.997 | 99.860 | 99.990 |
| Soot component (%) | $NO_3$ | 0.08 | 0.08 | 0.08 | 0.06 | 0.06 | 0.15 | 0.08 |
| | Ashes | 0.04 | 0.04 | 0.04 | 0.02 | 0.02 | 0.08 | 0.05 |
| | Reduced amount (105° C.) | 0.3 | 0.3 | 0.3 | 0.25 | 0.25 | 0.65 | 0.4 |
| | $Fe_2O_3$ | 0.02 | 0.02 | 0.02 | 0.02 | 0.02 | 0.03 | 0.02 |
| | S | 0.05 | 0.05 | 0.05 | 0.02 | 0.02 | 0.07 | 0.08 |
| | C | 99.51 | 99.51 | 99.51 | 99.63 | 99.63 | 99.02 | 99.37 |
| Amount contained in water (g/L) | Phytine | 5 | 2.2 | 2.5 | 1.5 | 1.5 | 2.0 | 2.0 |
| | Xylitol | 1.3 | 1.1 | 1.5 | 0.8 | 0.8 | 1.0 | 1.0 |

TABLE 3-continued component analysis result obtained in the silica extracting process of the present invention

|  |  | Example |  |  |  |  |  |  |
|---|---|---|---|---|---|---|---|---|
|  |  | 8 | 9 | 10 | 11 | 12 | 13 | 14 |
| Amount of organic substance contained in washed rice bran | | 0.005 | 0.005 | 0.005 | 0.005 | 0.005 | 0.028 | 0.025 |
| Amount of soot contained in smoke (rice bran 400 g) | | 0.25 | 0.25 | 0.25 | 0.18 | 0.25 | 1.3 | 1.2 |
| Final amount of soot | | — | — | — | — | 0.25 | — | — |
| Gas components created in burning (Mr/M3) | CO | 0.005 | 0.005 | 0.005 | 0.005 | 0.35 | 0.015 | 0.015 |
| | $CO_2$ | 0.005 | 0.005 | 0.005 | 0.005 | 0.38 | 0.01 | 0.01 |
| | $NO_2$ | 0.001 | 0.001 | 0.001 | 0.01 | 0.2 | 0.005 | 0.005 |
| $SiO_2$ componnent (%) | S | 0.0003 | 0.0005 | 0.0003 | 0.004 | 0.002 | 0.0004 | 0.0004 |
| | MgO | 0.0005 | 0.002 | 0.0005 | 0.001 | 0.003 | 0.002 | 0.001 |
| | CaO | 0.001 | 0.005 | 0.001 | 0.04 | 0.02 | 0.004 | 0.003 |
| | $Fe_2O_3$ | 0.0005 | 0.002 | 0.0005 | 0.001 | 0.003 | 0.002 | 0.002 |
| | C | 0.0004 | 0.0105 | 0.0004 | 0.1 | 0.001 | 0.002 | 0.001 |
| | $SiO_2$ | 99.998 | 99.990 | 99.998 | 99.815 | 99.964 | 99.990 | 99.993 |
| Soot component (%) | $NO_3$ | 0.08 | 0.08 | 0.08 | 0.08 | 0.15 | 0.08 | 0.08 |
| | Ash | 0.03 | 0.08 | 0.05 | 0.1 | — | 0.04 | 0.04 |
| | Reduced amount (105° C.) | 0.2 | 0.8 | 0.5 | 1.2 | — | 0.3 | 0.3 |
| | $Fe_2O_3$ | 0.02 | 0.02 | 0.02 | 0.0003 | — | 0.02 | 0.02 |
| | S | 0.04 | 0.09 | 0.09 | 1.0 | — | 0.05 | 0.05 |
| | C | 99.63 | 98.93 | 99.26 | 97.55 | — | 99.51 | 99.51 |
| Amount contained in water (g/L) | Phytine | 2.0 | 2.0 | 2.0 | 1.5 | — | 4.8 | 5.2 |
| | Xylitol | 1.0 | 1.0 | 1.0 | 0.5 | — | 1.1 | 1.4 |

|  |  | Example |  |  |  |  |  |  |
|---|---|---|---|---|---|---|---|---|
|  |  | 15 | 16 | 17 | 18 | 19 | 20 | 21 |
| Amount of organic substance contained in washed rice bran | | 0.023 | 0.21 | 0.025 | 0.023 | 0.020 | 0.018 | 0.018 |
| Amount of soot contained in smoke (rice bran 400 g) | | 1.0 | 0.9 | 1.2 | 1.0 | 0.9 | 0.8 | 0.8 |
| Final amount of soot | | — | — | — | — | — | — | — |
| Gas components created in burning (Mr/M3) | CO | 0.012 | 0.012 | 0.015 | 0.012 | 0.012 | 0.01 | 0.010 |
| | $CO_2$ | 0.008 | 0.008 | 0.01 | 0.0008 | 0.008 | 0.008 | 0.008 |
| | $NO_2$ | 0.004 | 0.004 | 0.005 | 0.004 | 0.004 | 0.003 | 0.003 |
| $SiO_2$ components (%) | S | 0.0003 | 0.0003 | 0.0004 | 0.0003 | 0.0003 | 0.0002 | 0.0002 |
| | MgO | 0.0007 | 0.0007 | 0.001 | 0.0007 | 0.0007 | 0.0005 | 0.0005 |
| | CaO | 0.001 | 0.001 | 0.003 | 0.002 | 0.001 | 0.0005 | 0.0005 |
| | $Fe_2O_3$ | 0.002 | 0.002 | 0.002 | 0.002 | 0.001 | 0.0006 | 0.0006 |
| | C | 0.001 | 0.001 | 0.001 | 0.001 | 0.001 | 0.0002 | 0.0002 |
| | $SiO_2$ | 99.995 | 99.995 | 99.993 | 99.994 | 99.996 | 99.998 | 99.998 |
| Soot component (%) | $NO_3$ | 0.08 | 0.08 | 0.08 | 0.08 | 0.08 | 0.06 | 0.06 |
| | Ash | 0.04 | 0.04 | 0.04 | 0.04 | 0.04 | 0.03 | 0.03 |
| | Reduced amount (105° C.) | 0.3 | 0.3 | 0.3 | 0.3 | 0.3 | 0.26 | 0.26 |
| | $Fe_2O_3$ | 0.02 | 0.02 | 0.02 | 0.02 | 0.02 | 0.02 | 0.02 |
| | S | 0.05 | 0.05 | 0.05 | 0.05 | 0.05 | 0.04 | 0.04 |
| | C | 99.51 | 99.51 | 99.51 | 99.51 | 99.51 | 99.59 | 99.59 |

TABLE 3-continued component analysis result obtained in the silica extracting process of the present invention

| Amount contained in water (g/L) | Phytine | 5.2 | 5.3 | 5.0 | 5.0 | 5.0 | 5.0 | 5.0 |
|---|---|---|---|---|---|---|---|---|
| | Xylitol | 1.4 | 1.5 | 1.3 | 1.3 | 1.3 | 1.3 | 1.3 |

| | | Example | | | | | | |
|---|---|---|---|---|---|---|---|---|
| | | 22 | 23 | 24 | 25 | 26 | 27 | 28 |
| Amount of organic substance contained in washed rice bran | | 0.020 | 0.018 | 0.019 | 0.025 | 0.018 | | 0.019 |
| Amount of soot contained in smoke (rice bran 400 g) | | 1.0 | 0.9 | 1.0 | 1.2 | 0.9 | | 1.0 |
| Final amount of soot | | — | — | — | — | — | | — |
| Gas components created in burning (Mr/M3) | CO | 0.015 | 0.014 | 0.014 | 0.015 | 0.014 | | 0.014 |
| | $CO_2$ | 0.1 | 0.01 | 0.01 | 0.01 | 0.01 | | 0.01 |
| | $NO_2$ | 0.005 | 0.004 | 0.004 | 0.005 | 0.004 | | 0.004 |
| $SiO_2$ component (%) | S | 0.0003 | 0.0002 | 0.0002 | 0.0004 | 0.0002 | 0.0003 | 0.0002 |
| | MgO | 0.0008 | 0.0006 | 0.0006 | 0.001 | 0.0006 | 0.0008 | 0.0006 |
| | CaO | 0.0011 | 0.0008 | 0.0008 | 0.003 | 0.0008 | 0.0011 | 0.0008 |
| | $Fe_2O_3$ | 0.002 | 0.0007 | 0.0017 | 0.002 | 0.0007 | 0.002 | 0.0017 |
| | C | 0.0008 | 0.0007 | 0.0007 | 0.001 | 0.0007 | 0.0008 | 0.0007 |
| | $SiO_2$ | 99.995 | 99.997 | 99.996 | 99.993 | 99.997 | 99.995 | 99.996 |
| Soot component (%) | $NO_3$ | 0.08 | 0.08 | 0.08 | 0.08 | 0.08 | 0.08 | 0.08 |
| | Ash | 0.04 | 0.04 | 0.04 | 0.04 | 0.04 | 0.04 | 0.04 |
| | Reduced amount (105° C.) | 0.3 | 0.3 | 0.3 | 0.3 | 0.3 | 0.3 | 0.3 |
| | $Fe_2O_3$ | 0.02 | 0.02 | 0.02 | 0.02 | 0.02 | 0.02 | 0.02 |
| | S | 0.05 | 0.05 | 0.05 | 0.05 | 0.05 | 0.05 | 0.05 |
| | C | 99.51 | 99.51 | 99.51 | 99.51 | 99.51 | 99.51 | 99.51 |
| Amount contained in water (g/L) | Phytine | 5.0 | 5.0 | 5.0 | 5 | 5.0 | 5.0 | 5.0 |
| | Xylitol | 1.3 | 1.3 | 1.3 | 1.3 | 1.3 | 1.3 | 1.3 |

| | | Example | | | | | | | |
|---|---|---|---|---|---|---|---|---|---|
| | | 29 | 30 | 31 | 32 | 33 | 34 | 35 | 36 |
| Amount of organic substance contained in washed rice bran | | 0.018 | 0.025 | 0.018 | 0.025 | 0.023 | 0.020 | 0.025 | 0.020 |
| Amount of soot contained in smoke (rice bran 400 g) | | 0.9 | 1.2 | 0.9 | 1.2 | 1.1 | 1.0 | 1.2 | 1.0 |
| Final amount of soot | | — | — | — | — | — | — | — | — |
| Gas component created in burning (Mr/M3) | CO | 0.014 | 0.015 | 0.014 | 0.015 | 0.015 | 0.015 | 0.015 | 0.015 |
| | $CO_2$ | 0.01 | 0.01 | 0.01 | 0.01 | 0.01 | 0.01 | 0.01 | 0.01 |
| | $NO_2$ | 0.004 | 0.005 | 0.004 | 0.005 | 0.005 | 0.005 | 0.005 | 0.005 |
| $SiO_2$ component (%) | S | 0.0002 | 0.0004 | 0.0002 | 0.0004 | 0.0003 | 0.0003 | 0.0004 | 0.0003 |
| | MgO | 0.0006 | 0.001 | 0.0006 | 0.001 | 0.001 | 0.0008 | 0.001 | 0.0008 |
| | CaO | 0.0008 | 0.003 | 0.0008 | 0.003 | 0.003 | 0.0011 | 0.003 | 0.0011 |
| | $Fe_2O_3$ | 0.0007 | 0.02 | 0.0007 | 0.02 | 0.0016 | 0.02 | 0.02 | 0.02 |
| | C | 0.0007 | 0.001 | 0.0007 | 0.001 | 0.0001 | 0.0008 | 0.004 | 0.0008 |
| | $SiO_2$ | 99.997 | 99.993 | 99.997 | 99.993 | 99.994 | 99.995 | 99.990 | 99.995 |

TABLE 3-continued component analysis result obtained in the silica extracting process of the present invention

| | | | | | | | | | |
|---|---|---|---|---|---|---|---|---|---|
| Soot component (%) | NO$_3$ | 0.08 | 0.08 | 0.08 | 0.08 | 0.08 | 0.08 | 0.08 | 0.08 |
| | Ash | 0.04 | 0.04 | 0.04 | 0.04 | 0.04 | 0.04 | 0.04 | 0.04 |
| | Reduced amount (105° C.) | 0.3 | 0.3 | 0.3 | 0.3 | 0.3 | 0.3 | 0.3 | 0.3 |
| | Fe203 | 0.02 | 0.02 | 0.02 | 0.02 | 0.02 | 0.02 | 0.02 | 0.02 |
| | S | 0.05 | 0.05 | 0.05 | 0.05 | 0.05 | 0.05 | 0.05 | 0.05 |
| | C | 99.51 | 99.51 | 99.51 | 99.51 | 99.51 | 99.51 | 99.51 | 99.51 |
| Amount contained in water (g/L) | Phytine | 5.0 | 5 | 5.0 | 5 | 5 | 5 | 5 | 5 |
| | Xylitol | 1.3 | 1.3 | 1.3 | 1.3 | 1.3 | 1.3 | 1.3 | 1.3 |

The present invention will now be further illustrated by the following examples. It will be apparent to those having ordinary skill in the field that these examples are given only to explain the present invention more clearly, but the invention is not limited to the examples given.

EXAMPLE 1

After rice bran was sieved by using an electric sieve to filter out wastes, washed in cool water and then stirred while being washed in hot water at 85~90° C. for 30 minutes~2 hours. Impurities floated on the water were filtered out.

Next, the rice bran was stirred while being washed in a 10% acid solution at 85~95° C. for two hours to remove impurities.

After the rice bran was washed in the acid solution, they were washed in hot water at 85~90° C. for 10~15 minutes to filter out wastes.

The rice bran was again washed in cool water, and then dehydrated at a pressure of 0.1 Mpa.

The rice bran was again washed in water for 10~15 minutes, washed in a 5% acid solution at 85~95° C. for 1 hour and 30 minutes~2 hours, washed in distilled water at 85~90° C. for 20~30 minutes, and then rinsed four times for 10~15 minutes in cool distilled water.

And then, the rice bran was evenly mixed to be dried with a hot air at a temperature of 80~100° C., and then were evenly mixed to be burned in an enamel-coated oven at 350~400° C.

Smoke generated at the time was extracted to filter soot therefrom and the finally remaining smoke was stored in a water tank.

Thereafter, the rice bran was put in a quartz glass tube with a sieve installed at a lower portion thereof and burned at a temperature of 700~800° C. for 30 minutes while supplying oxygen suitably thereto.

Then, little soot was generated for the generated smoke, and CO and NO$_2$ were lower than a standard allowed value.

With this method, SiO2 having a purity of 99.993% was obtained. In this respect, during the first burning, soot of a purity of 99.51% was generated.

A component analysis was performed on the silica and the soot obtained in accordance with the present invention by using a component analysis method of a general chemical substance, and the resulting component analysis as shown in Table 3 was obtained.

EXAMPLE 2

The same extraction method as that of Example 1 was applied, except that the dehydration pressure was 0.01 Mpa. In this case, impurities contained in the rice bran was increased by about 0.005% compared to Example 1, and SiO$_2$ of a purity of 99.991% was obtained. The component analysis was performed in the same manner as that of Example 1, the results of which detailed component analysis were as shown in Table 3.

EXAMPLE 3

The same extraction method as that of Example 1 was applied, except that the dehydration pressure was 0.005 Mpa. In this case, impurities contained in the rice bran was increased by about 0.02% compared to Example 1, and SiO$_2$ of a purity of 99.98% was obtained. The component analysis was performed in the same manner as that of Example 1, the results of which detailed component analysis were as shown in Table 3.

EXAMPLE 4

The same extraction method as that of Example 1 was applied, except that the dehydration pressure was 10 Mpa. In this case, impurities contained in the rice bran was increased by about 0.005% compared to Example 1, and SiO$_2$ of a purity of 99.997% was obtained. The component analysis was performed in the same manner as that of Example 1, the results of which detailed component analysis were as shown in Table 3.

EXAMPLE 5

The same extraction method as that of Example 1 was applied, except that the dehydration pressure was 15 Mpa. In this case, SiO$_2$ of a purity of 99.9971% was obtained. The component analysis was performed in the same manner as that of Example 1, the results of which detailed component analysis were as shown in Table 3.

EXAMPLE 6

The same extraction method as that of Example 1 was applied, except that the wastes floated on the water in the washing process were not removed and the dehydration pressure was 10 Mpa. In this case, impurities contained in the rice bran was 0.6%, the content of C was 0.1%, and SiO$_2$ of a purity of 99.86% was obtained. The component analysis was performed in the same manner as that of Example 1, the results of which detailed component analysis were as shown in Table 3.

EXAMPLE 7

The same extraction method as that of Example 1 was applied, except that the dehydration pressure was 10 Mpa and the secondary burning process was performed at a temperature of 700~1000° C. for 10 minutes. In this case, $SiO_2$ of a purity of 99.99% was obtained. The component analysis was performed in the same manner as that of Example 1, the results of which detailed component analysis were as shown in Table 3.

EXAMPLE 8

The same extraction method as that of Example 7 was applied, except that the secondary burning process was performed at a temperature of 700~800° C. for 40 minutes. In this case, $SiO_2$ of a purity of 99.998% was obtained. The component analysis was performed in the same manner as that of Example 1, the results of which detailed component analysis were as shown in Table 3.

EXAMPLE 9

The same extraction method as that of Example 7 was applied, except that the secondary burning process was performed at a temperature of 700~800° C. for 5 minutes. In this case, $SiO_2$ of a purity of 99.998% was obtained. The component analysis was performed in the same manner as that of Example 1, the results of which detailed component analysis were as shown in Table 3.

EXAMPLE 10

The same extraction method as that of Example 4 was applied, except that the first burning process was performed in the same manner as that of Example 1 and the secondary burning process was performed at a temperature of 700~800° C. for 60 minutes. In this case, even though the secondary burning process was performed for 60 minutes, it had the same effect as in the case of burning for 40 minutes.

EXAMPLE 11

The same extraction method as that of Example 7 was applied, except that the rice bran was roasted at a temperature of 350~400° C. in the first burning process, but without agitation. In this case, $SiO_2$ of a purity of 99.815% was obtained, and the amount of $NO_2$ was finally increased

EXAMPLE 12

The same extraction method as that of Example 4 was applied, except that the process for removing a gas generated when the rice bran is burned at a temperature of 350~400° C. in the first burning process and the following soot processing were omitted. Detrimental components such as CO or $NO_2$ were much contained, which is not good for the environment.

EXAMPLE 13

The same extraction method as that of Example 1 was applied, except that after the rice bran was washed in hot water at 100° C. for 15 minutes, a dehydration process under pressure were performed at 10 Mpa. In this case, $SiO_2$ of a purity of 99.990% was obtained. When the rice bran was first burned, soot of a purity of 99.51% was created.

EXAMPLE 14

The same extraction method as that of Example 13 was applied, except that the rice bran was washed in hot water at 100° C. for 30 minutes in the washing process. In this case, $SiO_2$ of a purity of 99.993% was obtained. The detailed component analysis results were as shown in Table 3.

EXAMPLE 15

The same extraction method as that of Example 13 was applied, except that the rice bran was washed in hot water at 100° C. for 60 minutes in the washing process. In this case, $SiO_2$ of a purity of 99.995% was obtained. The detailed component analysis results were as shown in Table 3.

EXAMPLE 16

The same extraction method as that of Example 13 was applied, except that the rice bran was washed in hot water of 100° C. for 90 minutes in the washing process. In this case, $SiO_2$ of a purity of 99.995% was obtained. The detailed component analysis results were as shown in Table 3.

EXAMPLE 17

The same extraction method as that of Example 1 was applied, except that the rice bran was washed in a 10% sulfuric acid solution at 100° C. for 10 minutes and then washed in water of 100° C. for 20 minutes in the acid solution washing process. In this case, $SiO_2$ of a purity of 99.993% was obtained. The detailed component analysis results were as shown in Table 3.

EXAMPLE 18

The same extraction method as that of Example 17 was applied, except that the rice bran was washed in a 10% sulfuric acid solution at 100° C. for 20 minutes in the acid solution washing process. In this case, $SiO_2$ of a purity of 99.994% was obtained. The detailed component analysis results were as shown in Table 3.

EXAMPLE 19

The same extraction method as that of Example 17 was applied, except that the rice bran was washed in a 10% sulfuric acid solution at 100° C. for 60 minutes in the acid solution washing process. In this case, $SiO_2$ of a purity of 99.996% was obtained. The detailed component analysis results were as shown in Table 3.

EXAMPLE 20

The same extraction method as that of Example 17 was applied, except that the rice bran was washed in a 10% sulfuric acid solution at 100° C. for 120 minutes in the acid solution washing process. In this case, $SiO_2$ of a purity of 99.998% was obtained. The detailed component analysis results were as shown in Table 3.

EXAMPLE 21

The same extraction method as that of Example 17 was applied, except that the rice bran was washed in a 10% sulfuric acid solution at 100° C. for 240 minutes in the acid solution washing process. In this case, $SiO_2$ of a purity of 99.998% was obtained. The detailed component analysis results were as shown in Table 3.

EXAMPLE 22

The same extraction method as that of Example 1 was applied, except that the rice bran was maintained at –10° C. for 40 minutes after being washed in water and before being washed in an acid solution. In this case, $SiO_2$ of a purity of 99.995% was obtained. The detailed component analysis results were as shown in Table 3.

EXAMPLE 23

The same extraction method as that of Example 1 was applied, except that the rice bran was maintained at –70° C.

for 40 minutes after being washed in water and before being washed in an acid solution. In this case, $SiO_2$ of a purity of 99.997% was obtained. The detailed component analysis results were as shown in Table 3.

EXAMPLE 24

The same extraction method as that of Example 1 was applied, except that the rice bran was maintained at −140° C. for 10 minutes after being washed in water and before being washed in an acid solution. In this case, $SiO_2$ of a purity of 99.996% was obtained. The detailed component analysis results were as shown in Table 3.

EXAMPLE 25

The same extraction method as that of Example 1 was applied, except that the rice bran was maintained at −5° C. for 400 minutes after being washed in water and before being washed in an acid solution. In this case, $SiO_2$ of a purity of 99.993% was obtained. The detailed component analysis results were as shown in Table 3.

EXAMPLE 26

The same extraction method as that of Example 1 was applied, except that the rice bran was frozen at −170° C. and maintained for 10 minutes after being washed in water and before being washed in an acid solution. In this case, $SiO_2$ of a purity of 99.997% was obtained. The detailed component analysis results were as shown in Table 3.

EXAMPLE 27

The same extraction method as that of Example 1 was applied, except that the rice bran was left in a closed chamber in which the pressure was 100 Pa after being washed in water and before being washed in an acid solution. In this case, $SiO_2$ of a purity of 99.995% was obtained. The detailed component analysis results were as shown in Table 3.

EXAMPLE 28

The same extraction method as that of Example 1 was applied, except that the rice bran was left in a closed chamber in which the pressure was 10 Pa after being washed in water and before being washed in an acid solution. In this case, $SiO_2$ of a purity of 99.996% was obtained. The detailed component analysis results were as shown in Table 3.

EXAMPLE 29

The same extraction method as that of Example 1 was applied, except that the rice bran was left in a closed chamber in which the pressure was 1 Pa after being washed in water and before being washed in an acid solution. In this case, $SiO_2$ of a purity of 99.997% was obtained. The detailed component analysis results were as shown in Table 3.

EXAMPLE 30

The same extraction method as that of Example 1 was applied, except that the rice bran was left in a closed chamber in which the pressure was 200 Pa after being washed in water and before being washed in an acid solution. In this case, $SiO_2$ of a purity of 99.993% was obtained. The detailed component analysis results were as shown in Table 3.

EXAMPLE 31

The same extraction method as that of Example 1 was applied, except that the rice bran was left in a closed chamber in which the pressure was 0.5 Pa after being washed in water and before being washed in an acid solution. In this case, $SiO_2$ of a purity of 99.997% was obtained. The detailed component analysis results were as shown in Table 3.

EXAMPLE 32

The same extraction method as that of Example 1 was applied, except that the rice bran was processed in a microwave oven for 30 seconds in the drying process. In this case, $SiO_2$ of a purity of 99.993% was obtained. The detailed component analysis results were as shown in Table 3.

EXAMPLE 33

The same extraction method as that of Example 1 was applied, except that the rice bran was processed in a microwave oven for 100 seconds in the drying process. In this case, $SiO_2$ of a purity of 99.994% was obtained. The detailed component analysis results were as shown in Table 3.

EXAMPLE 34

The same extraction method as that of Example 1 was applied, except that the rice bran was processed in a microwave oven for 300 seconds in the drying process. In this case, $SiO_2$ of a purity of 99.995% was obtained. The detailed component analysis results were as shown in Table 3.

EXAMPLE 35

The same extraction method as that of Example 1 was applied, except that the rice bran was processed in a microwave oven for 15 seconds in the drying process. In this case, $SiO_2$ of a purity of 99.990% was obtained. The detailed component analysis results were as shown in Table 3.

EXAMPLE 36

The same extraction method as that of Example 1 was applied, except that the rice bran was processed in a microwave oven for 400 seconds in the drying process. In this case, $SiO_2$ of a purity of 99.995% was obtained. The detailed component analysis results were as shown in Table 3.

INDUSTRIAL APPLICABILITY

As so far described, the method for extracting high purity amorphous silica or solid silica of more than 99.99% purity, which is suitable to the industrial sector such as for a semiconductor which requires a strict purity.

In addition, the soot, the by-product detrimental to the environment, generated during burning of the rice bran in a process of extracting silica can be effectively removed. The soot can be utilized to fabricate phytine, phytic acid and xylitol, or rubber or antiseptic products. Accordingly, high purity silica can be extracted from the rice bran, a low cost material, and a silica extraction method harmless to the environment is provided.

What is claimed is:

1. A method for extracting silica of more than 99.99% purity from rice bran, comprising the steps of:

(a) washing rice bran in water and removing impurities floated on the water;

(b) sequentially washing the rice bran in an acid solution and water at least twice;

(c) dehydrating the washed rice bran under pressure;

(d) drying the dehydrated rice bran;

(e) primarily burning the dried rice bran at a temperature of 350~400° C. while being agitated and pulverized; and (f) secondarily burning the rice bran at a temperature of 700~1000° C. for 10~60 minutes while being agitated by providing oxygen or air.

2. The method of claim 1, wherein the extracted silica is amorphous or in a solid state.

3. The method of claim 1, wherein, in the washing steps (a) and (b), the rice bran is agitated and washed by using hot distilled water of 85~95° C.

4. The method of claim 1, wherein, in the washing steps (a) and (b), the rice bran is washed by using boiling water of 100° C. for 0.5~2 hours.

5. The method of claim 1 or 4, wherein, in the step (b) of washing the rice bran in the acid solution, the rice bran is washed in an acid solution of 100° C. for 10~30 minutes.

6. The method of claim 1, wherein, before washing the rice bran in the acid solution, the rice bran is frozen at a temperature of −10~−170° C. for 10~300 minutes.

7. The method of claim 1, wherein, before washing the rice bran in the acid solution, the washed rice bran is subjected to decompression at 1~100 Pa pressure.

8. The method of claim 1, wherein, in the dehydrating step (c), the pressure is 0.01 to 15 Mpa.

9. The method of claim 1, wherein, in the drying step (d), the rice bran is processed in an electric microwave oven or by hot air drying for 30~300 seconds.

10. The method of claim 1, wherein, in the burning steps (e) and (f), the soot is removed.

11. The method of claim 10, further comprising a step of extracting phytine, phytic acid or xylitol from supernatant of water through which the soot has passed.

12. The method of claim 1, wherein, in the oxidation and burning step (f), the burning temperature is 700~800° C. and the burning time period is 10~60 minutes.

* * * * *